United States Patent
Jiang

(10) Patent No.: US 11,399,383 B2
(45) Date of Patent: Jul. 26, 2022

(54) METHOD AND DEVICE FOR REQUESTING UPLINK TRANSMISSION RESOURCE

(71) Applicant: BEIJING XIAOMI MOBILE SOFTWARE CO., LTD., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 76 days.

(21) Appl. No.: 16/877,454

(22) Filed: May 18, 2020

(65) Prior Publication Data
US 2020/0281010 A1    Sep. 3, 2020

Related U.S. Application Data

(63) Continuation of application No. PCT/CN2017/111946, filed on Nov. 20, 2017.

(51) Int. Cl.
| | | |
|---|---|---|
| H04W 4/00 | (2018.01) | |
| H04W 72/12 | (2009.01) | |
| H04W 72/04 | (2009.01) | |
| H04W 74/08 | (2009.01) | |

(52) U.S. Cl.
CPC ..... *H04W 72/1268* (2013.01); *H04W 72/042* (2013.01); *H04W 72/0413* (2013.01); *H04W 74/0833* (2013.01)

(58) Field of Classification Search
CPC ......... H04W 74/0833; H04W 28/0278; H04W 72/1284; H04W 72/1268; H04W 72/042; H04W 72/0413
See application file for complete search history.

(56) References Cited

U.S. PATENT DOCUMENTS

| | | | | |
|---|---|---|---|---|
| 10,966,119 | B2 * | 3/2021 | Lee | .................. H04W 28/0231 |
| 2010/0254333 | A1 | 10/2010 | Shin et al. | |
| 2012/0195218 | A1 * | 8/2012 | Lee | ......................... H04W 4/12 370/252 |
| 2012/0294270 | A1 | 11/2012 | Yamada et al. | |

(Continued)

FOREIGN PATENT DOCUMENTS

| | | |
|---|---|---|
| AU | 2015203574 B2 | 5/2016 |
| CN | 103249169 B | 8/2016 |

(Continued)

OTHER PUBLICATIONS

European Search Report issued in EP17931931.4 dated Nov. 20, 2020, 9 pages.

(Continued)

*Primary Examiner* — Bo Hui A Zhu
(74) *Attorney, Agent, or Firm* — Arch & Lake LLP

(57) ABSTRACT

The present application provides a method and device for requesting an uplink transmission resource. The method includes: triggering an uplink resource Scheduling Request (SR), in response to a preset random access trigger condition, triggering a contention based random access request; before completing a contention based random access procedure, in response to a preset random access cancellation condition, cancelling the contention based random access procedure, wherein the preset random access cancellation condition comprises at least detecting valid uplink resource information.

20 Claims, 7 Drawing Sheets

(56) References Cited

U.S. PATENT DOCUMENTS

| | | | |
|---|---|---|---|
| 2016/0157256 A1 | 6/2016 | Tseng | |
| 2016/0374110 A1 | 12/2016 | Lee et al. | |
| 2017/0188349 A1 | 6/2017 | Lee et al. | |
| 2017/0310433 A1 | 10/2017 | Dinan | |

FOREIGN PATENT DOCUMENTS

| | | | |
|---|---|---|---|
| CN | 106031224 A | 10/2016 | |
| CN | 106465401 A | 2/2017 | |
| CN | 106993335 A | 7/2017 | |
| JP | 2013502163 A | 1/2013 | |
| KR | 20110066027 A | 6/2011 | |
| RU | 2577028 C2 | 3/2016 | |
| WO | 2016182344 A1 | 11/2016 | |
| WO | 2017007148 A1 | 1/2017 | |
| WO | 2019095390 A1 | 5/2019 | |

OTHER PUBLICATIONS

Russian Office Action (including English translation) issued in RU App. No. 2020118288/07(031025) dated Sep. 28, 2020, 19 pages.
First Office Action issued to Japanese Application No. 2020526483 dated May 7, 2021 with English translation, (10p).
First Office Action issued to Indian Application No. 202027026041 dated Jul. 13, 2021, (5p).
LG Electronics Inc., "Issues with Scheduling Request Procedure", Discussion and Decision, 3GPP TSG-RAN WG2 #61, R2-081083, Sorrento, Italy, Feb. 11-15, 2008, (4p).
International Search Report issued to PCT Application No. PCT/CN2017/111946 dated Jul. 31, 2018, (4p).
First Office Action to Chinese Patent Application No. 201780001913.7 dated Mar. 13, 2019 with English translation, (14p).
LG Electronics, "Issues With Scheduling Request Procedure", R2-081597—3GPP TSG-RAN WG2 #61bis, Shenzhen, China, Mar. 4-31, 2008, (4p).
Motorola, "RACH Procedure Cancellation", R2-081069—3GPP TSG-RAN2 Meeting #61, Sorrento, Italy, Feb. 11-15, 2008, (1p).
First Office Action issued to Korean Patent Application 10-2020-7016404 dated Oct. 7, 2021 with English translation, (8p).
Notice of Allowance issued to Korean Patent Application 10-2020-7016404 dated Feb. 22, 2022 with English translation, (3p).

* cited by examiner

METHOD AND DEVICE FOR REQUESTING UPLINK TRANSMISSION RESOURCE

CROSS-REFERENCE TO RELATED APPLICATIONS

This application is based upon and claims priority to PCT patent application No. PCT/CN2017/111946, filed on Nov. 20, 2017, the entire contents of which are incorporated herein by reference.

TECHNICAL FIELD

The present disclosure generally relates to communication technologies, and more particularly, to a method and device for requesting an uplink transmission resource.

BACKGROUND

With the development of wireless communication technologies, mobile communication networks have gradually evolved towards 5G networks. In the early stages of the 5G network layout, 4G network LTE (Long Term Evolution) system is still used for the main signal coverage, and 5G network or NR (New Radio) system is used as a powerful complement to data transmission services, forming LTE-NR interworking layout.

In the LTE-NR interworking phase, when a UE needs to report a Buffer Status Report (BSR), if no Physical Uplink Shared Channel (PUSCH) resource is available and no Scheduling Request (SR) resource is configured within a preset time interval agreed by the system, the UE will initiate a random access request to a base station at the end of the preset time interval to apply for uplink transmission resources. However, when the UE is in a connected state, the random access channel configured by the system for the UE may be relatively sparse, for example, the system may configure random access channel resources only on odd or even frames. For the current UE, it is possible that available uplink transmission resources are monitored before the random access channel resources arrive, but according to relevant protocols, the UE does not cancel the above random access request, and this will result in waste of system resources or increased transmission delay of the uplink transmission resource requests, and consequently affect the communication experience of user terminals.

SUMMARY

Embodiments of the present disclosure provide a method and device for requesting an uplink transmission resource for addressing problems with related arts.

According to a first aspect of the present disclosure, there is provided a method for requesting an uplink transmission resource. The method may be applied in a user terminal and includes: triggering an uplink resource Scheduling Request (SR); in response to the preset random access trigger condition being satisfied, triggering a contention based random access request; before completing a contention based random access procedure, in response to the preset random access cancellation condition being satisfied, cancelling the contention based random access procedure, wherein the preset random access cancellation condition includes at least the following case that valid uplink resource information is detected.

According to a second aspect of the present disclosure, there is provided a device for requesting an uplink transmission resource, wherein the device is applied in a user terminal and includes: a memory; a processor for storing instructions; wherein the processor is configured to: trigger an uplink resource Scheduling Request (SR), in response to a preset random access trigger condition being satisfied, trigger a contention based random access request; before complete a contention based random access procedure, in response to a preset random access cancellation condition being satisfied, cancel the contention based random access procedure, wherein the preset random access cancellation condition comprises at least detecting valid uplink resource information.

According to a third aspect of the present disclosure, there is provided a non-transitory computer-readable storage medium having a computer program stored thereon, wherein the computer program is configured to perform steps in the method according to any one of the above aspects.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Figure 1:
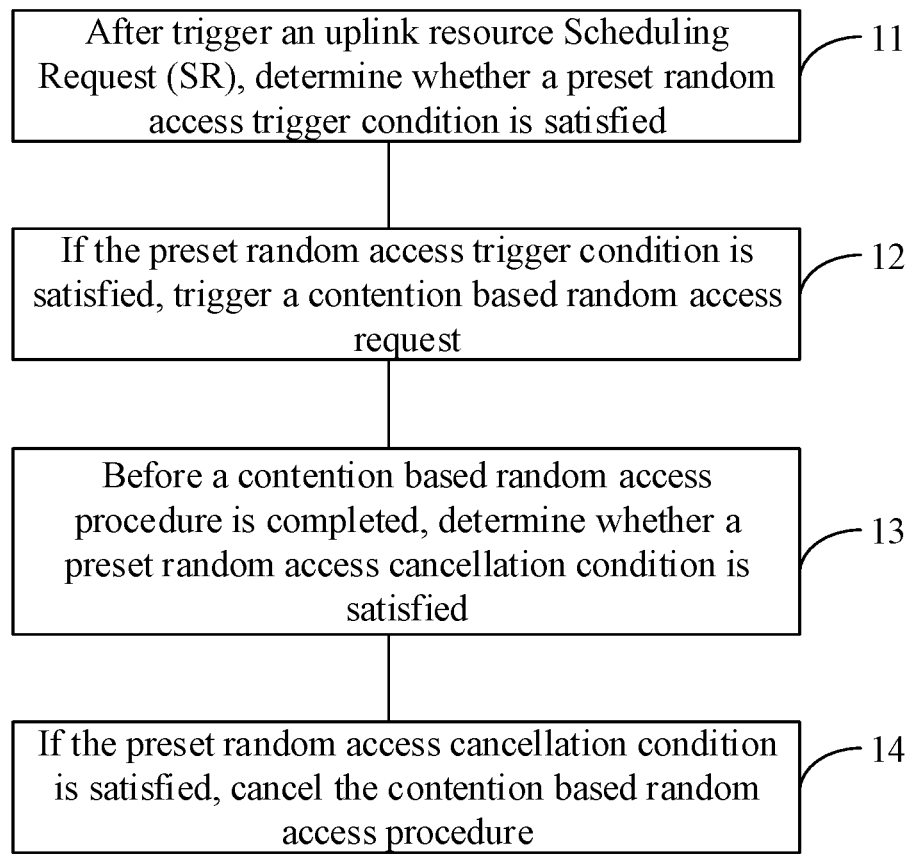
FIG. 1 is a flowchart of a method for requesting an uplink transmission resource according to an example of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

The entities involved in the present disclosure include: a base station and User Equipment (UE) in a LTE-NR interworking phase of a 5G network. The base station may be a base station or a sub-base station provided with a large-scale antenna array or the like. The UE may be a user terminal, a user node, a mobile terminal, or a tablet computer or the like. In some embodiments, the base station and the UE are independent of each other, and they also communicate with each other to jointly implement the technical solutions provided by the present disclosure.

First, an application scenario of the present disclosure is described. When the UE needs to send data to a network side, such as a base station, it needs uplink transmission resources that carry the to-be-transmitted data. If the uplink transmission resources allocated to the UE among the current transmission link resources are insufficient, the UE needs to first request the base station to allocate an uplink shared channel (PUSCH) transmission resource, such as an uplink Resource Block (RB) in the LTE system.

In the procedure of requesting uplink transmission resources, the UE may request the base station to allocate uplink transmission resources in the following three ways:

The first way is to send a Buffer Status Report (BSR) to the base station through a Physical Uplink Shared Channel (PUSCH). Using this method, the UE can report to the base station the amount of the to-be-transmitted data and the amount of resources that are expected to be allocated. This is convenient for the base station to allocate appropriate uplink transmission resources for the UE by referring to the report information.

The second way is to send a Scheduling Request (SR) to the base station through a Physical Uplink Control Channel (PUCCH). Because the PUCCH resources are valuable, the base station may not necessarily configure the resources for transmitting SR for each UE, and this method cannot tell the base station the amount of data currently to be transmitted and the amount of resources that it is expected to be allocated.

The third way is to use a special cell (SpCell) to initiate a contention based random access request to the base station, and applies for uplink transmission resources. The third method has a larger delay than the previous two methods.

In the procedure when the UE applies for uplink transmission resources, the BSR method will be preferentially adopted. If the BSR cannot be sent, the SR method will be adopted, and finally, the contention based random access will be considered.

An embodiment of the present disclosure provides a method for requesting an uplink transmission resource, which is applied in a user terminal. FIG. 1 is a flowchart of a method for requesting an uplink transmission resource according to an example. The method may include the following steps:

In step 11, after an uplink resource Scheduling Request (SR) is triggered, whether a preset random access trigger condition is satisfied is determined.

In an embodiment of the present disclosure, the UE detects resource information after determining a BSR to be transmitted. The procedure of detecting resource information includes: determining whether there is an uplink shared channel (UL-SCH) resource for transmitting the BSR, and whether there is a configured UL-grant, so that the UE predicts that a subsequent UL-SCH resource is available according to the configured UL-grant; and, whether the preset random access trigger condition is satisfied is determined according to the detected resource information.

In a case where the detected resource information meets a preset SR trigger condition, an uplink resource SR may be triggered.

In embodiments of the present disclosure, the UE may determine whether to trigger the uplink resource SR according to any one of the following preset SR trigger conditions:

SR trigger condition 1: there is no uplink shared channel (UL-SCH) resource available in a first preset time interval after the to-be-transmitted BSR is determined. In embodiments of the present disclosure, the available UL-SCH resource can carry the BSR and send the BSR to the base station.

The first preset time interval in embodiments of the present disclosure may be a basic information transmission unit adjacent to the basic information transmission unit when the to-be-sent BSR is determined and may be, for example, a basic information transmission unit specified by an LTE-NR network Time Division Duplexing (TDD) system protocol. The basic information transmission unit may be: a subframe, a symbol, a slot, a mini-slot, or the like. A symbol occupies the shortest length of time; a mini-slot can contain several symbols, such as 5 symbols; the number of symbols contained in a slot is slightly larger than the number of symbols in a mini-slot, for example, a slot consists of 7 symbols, and thus a slot is slightly longer than a mini-slot.

In another embodiment of the present disclosure, the preset time interval may also be a preset time interval in the unit of symbol, which is dynamically configured by the base station according to the scheduling information of the UE. For example, the preset time interval includes three symbols.

As an example, it is assumed that the first preset time interval is a basic information transmission unit specified in the system. Taking one subframe as an example, assuming that the UE determines that there is a BSR during the transmission of the first subframe, the UE can monitor whether there is a UL-SCH resource available for the UE when the second subframe arrives; and if is not an available UL-SCH resource, an uplink resource SR is triggered to prepare requesting the base station to allocate uplink transmission resources through the SR method.

SR trigger condition 2: there is no available UL-SCH resource and there is no configured UL-grant in the first preset time interval.

In embodiments of the present disclosure, the UE can predict based on the UL-grant that the base station subsequently allocates available UL-SCH resources to the UE.

Figure 2:
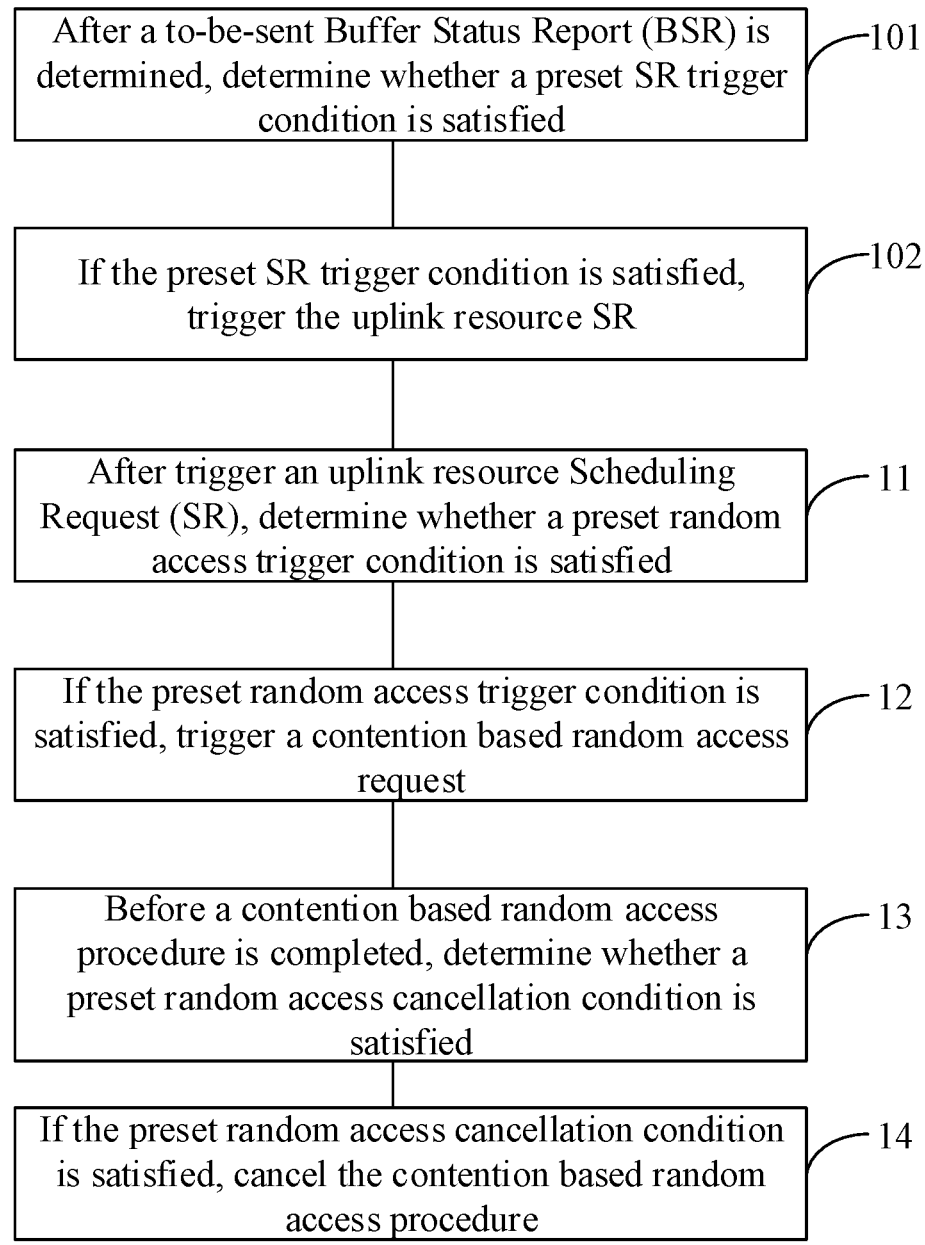
FIG. 2 is a flowchart of a method for requesting an uplink transmission resource according to an example of the present disclosure.

Corresponding to the above-mentioned SR triggering condition 2, FIG. 2 shows a flowchart of a method for requesting an uplink transmission resource according to an example. Before step 11, the method may further include the following steps:

In step 101, after a to-be-sent Buffer Status Report (BSR) is determined, whether a preset SR trigger condition is satisfied is determined. The preset SR trigger condition includes that there is no available uplink shared channel (UL-SCH) resource and there is no configured UL-grant within a first preset time interval, i.e. the above SR trigger condition 2.

In step 102, if the preset SR trigger condition is satisfied, the uplink resource SR is triggered.

In embodiments of the present disclosure, whether to trigger an SR request is determined according to the SR triggering condition 2, that is whether there are predictable UL-SCH resources that have not yet arrived is taken into consideration, in addition to considering whether there is an available UL-SCH resource within the first preset time interval.

If an available UL-SCH resource is received within the first preset time interval, or, at the end of the first preset time interval, it is determined that there is a configured UL-grant (that is, there is a predictable available UL-SCH resource), the available UL-SCH resource or the predicted available UL-SCH resource is preferentially used to transmit the BSR, avoiding requesting the uplink transmission resources from the base station by sending the uplink resource SR.

Conversely, if no available UL-SCH resource is received and there is no configured UL-grant within the first preset time interval, that is, there is no predictable available UL-SCH resource, an uplink resource SR is triggered.

By using the method for requesting an uplink transmission resource provided by embodiments of the present disclosure, on the one hand, when the UL-SCH resource subsequently allocated to the UE as indicated by the configured UL-grant arrives, the UL-SCH resource can be used to send the BSR, the UE does not need to apply for uplink transmission resources by sending uplink resource SR, and this can save PUCCH resources. On the other hand, when requesting uplink resources by SR, the base station cannot determine the data amount of the to-be-transmitted data, and therefore cannot allocate appropriate resources to the UE based on the amount of the to-be-transmitted data. UE still needs to send the BSR to apply for more uplink transmission resources subsequently. Therefore, the SR trigger conditions provided in embodiments of the present disclosure can reduce the number of times for the uplink resource scheduling requests.

If the UE determines that the uplink resource SR is triggered according to any of the preset SR trigger conditions, and obtains the uplink resource SR in the pending state, the UE can further determine whether the preset random access trigger condition is satisfied based on the subsequently detected resource information. If the preset random access trigger condition is satisfied, step 12 is performed; if the preset random access trigger condition is not satisfied, the UE requests uplink transmission resources to the base station by sending BSR or uplink resource SR based on the detected resource information.

In step 12, if the preset random access trigger condition is satisfied, a contention based random access request is triggered.

If there is currently an SR in the pending state in the UE, the UE will make the following judgments at each subsequent preset time interval: (1) determining whether there is a valid uplink control channel PUCCH resource configured for the UE at any time according to the current configuration information; the valid PUCCH resource can be used to send the uplink resource SR to the base station; (2) determining whether there is an available UL-SCH resource within the above-mentioned preset time interval; and (3) determining whether there is a configured UL-grant.

According to the determination results, whether to request an uplink transmission resource by triggering a contention random access request is determined.

In embodiments of the present disclosure, depending on the varied preset random access trigger conditions, the implementation of step 12 may include at least the following two cases:

In a first case, if it is determined according to the current configuration information that there is no valid physical uplink control channel (PUCCH) resource configured for transmitting the uplink resource SR at any time, and there is no available UL-SCH resource and there is no configured UL-grant within each preset time interval, the contention based random access request is triggered.

The preset time interval in embodiments of the present disclosure may be a system basic information transmission unit adjacent to the basic information transmission unit where the uplink resource SR trigger occasion is located. As described above, the preset time interval may be a basic information transmission unit specified in Time Division Duplexing (TDD) system protocols in the LTE-NR networks, for example, one subframe, one time slot, one mini-slot or the like. In another embodiment of the present disclosure, the preset time interval may be a preset time interval dynamically configured by the base station according to the scheduling information of the UE, for example, the preset time interval may be a preset time interval in symbol unit.

In the above first case, while triggering the contention based random access request, the following three conditions need to be met:

Condition 1: no available UL-SCH resource is monitored within a preset time interval.

Condition 2: there is no valid PUCCH resource configured at any time.

That is, according to the current configuration information, the base station not only does not configure the valid PUCCH resource for the UE within the preset time interval, and does not configure the valid PUCCH resource after the preset time interval.

Condition 3: the configured UL-grant is not detected.

If any of these conditions is not met, it is not enough to trigger the contention based random access request. The reasons are as follows:

If condition 1 is not satisfied, it means that the UE detects an available UL-SCH resource within a preset time interval after triggering the uplink resource SR, and using the real-time monitored UL-SCH resource, the UE can send to-be-transmitted data to the base station or the UE can send a BSR, and there is no need to apply for uplink transmission resources from the base station by initiating a contention based random access request.

If the condition 2 is not satisfied, it means that the UE has a valid PUCCH resource for transmitting the uplink resource SR after triggering the uplink resource SR, and there is no need to apply for uplink transmission resources by initiating a contention based random access request.

In embodiments of the present disclosure, a counter is set in the UE. Before the UE detects valid uplink resource information, each time the UE sends an uplink resource SR, the value of the counter is incremented by one.

If condition 3 is not satisfied, it means that the UE detects the configured UL-grant within a preset time interval after the uplink resource SR is triggered, and the UE can predict that a subsequent available UL-SCH resource will arrive based on the subsequently configured UL-grant. When the available UL-SCH resource arrives, the UE can send to-be-transmitted data to the base station or send a BSR to the base station, and there is no need to request resources by initiating a contention based random access request.

In another embodiment of the present disclosure, in a case that condition 1 or 3 is not satisfied, if there is currently an uplink resource scheduling request which is in the pending state in the UE, the uplink resource SR in the pending state may also be cancelled.

In a second case, different from the first case above, after the uplink resource SR is triggered, the UE determines that the base station configures at least one valid PUCCH resource for the UE, but the valid PUCCH resource cannot be used for transmitting the uplink resource SR which is in the pending state, and therefore a contention based random access request is triggered.

Figure 3:
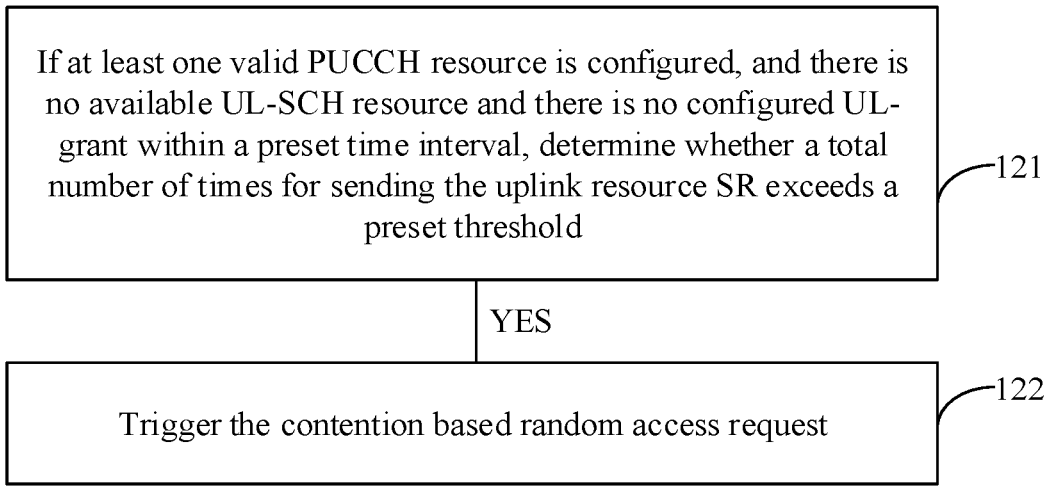
FIG. 3 is a flowchart of a method for requesting an uplink transmission resource according to an example of the present disclosure.

FIG. 3 is a flowchart of a method for requesting an uplink transmission resource according to an example. Step 12 may include the following steps:

In step 121, if at least one valid physical uplink control channel (PUCCH) resource is configured for transmitting the uplink resource SR, and there is no available UL-SCH resource and there is no configured UL-grant within a preset time interval, whether a total number of times for sending the uplink resource SR exceeds a preset threshold is determined.

In embodiments of the present disclosure, after sending the uplink resource SR, the UE will periodically and repeatedly send the uplink resource SR before detecting the valid uplink resource information configured for the UE by the base station. At the same time, the UE can start a counter, and before the valid uplink resource information is detected, each time the uplink resource SR is sent, the value of the above counter is incremented by one, so as to calculate the total number of initiations of the uplink resource SR. Whenever it is determined there is a configured valid PUCCH resource, whether the total number of times for sending the uplink resource SR exceeds a preset threshold is first determined.

In embodiments of the present disclosure, according to preset protocols, the UE is configured with a maximum number of SR transmission times, which can be represented as M. The total number of initiations of the uplink resource SR recorded by the counter is represented as N. In embodiments of the present disclosure, N is compared with M to determine whether the uplink resource SR currently in the pending state can be sent to the base station through the currently detected valid PUCCH resource. If N is smaller than M, it is indicated that the physical layer can send the uplink resource SR to the base station through the currently detected valid PUCCH resource; otherwise, step 122 is performed.

In step 122, if the total number of times for sending the uplink resource SR exceeds the preset threshold, the contention based random access request is triggered.

That is, if N is greater than or equal to M, it is determined that the detected valid PUCCH resources cannot be used to transmit the uplink resource SR currently in the pending state, all of the uplink resource SRs in the pending state are cancelled, and the contention based random access request is triggered.

In embodiments of the present disclosure, when the UE determines that the preset random access trigger condition described in the first case or the second case is met, the UE may send the contention based random access request to the base station through the special cell SpCell to request the base station to allocate uplink transmission resources for the UE. The SpCell may include: a PCell (Primary Cell) or a PSCell (Primary Secondary Cell).

Figure 4:
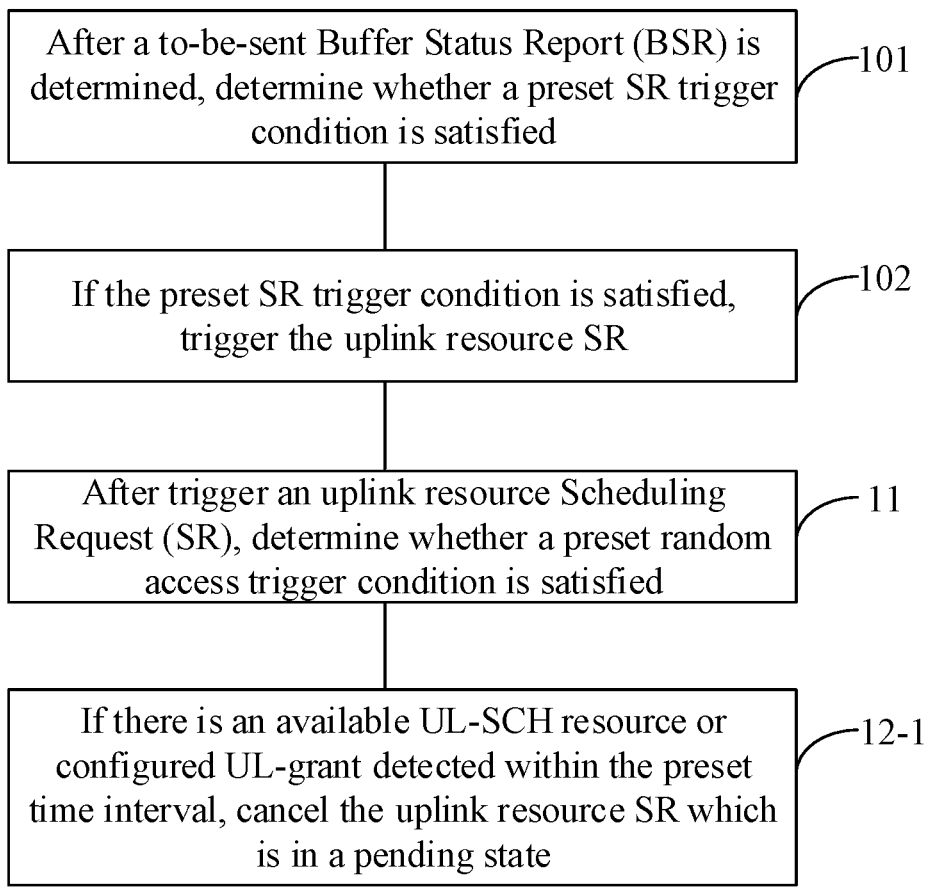
FIG. 4 is a flowchart of a method for requesting an uplink transmission resource according to an example of the present disclosure.

For the application scenarios opposite to the first case and the second case, FIG. 4 shows a flowchart of a method for requesting an uplink transmission resource according to an example. After step 11, the foregoing method can further include:

In step 12-1, if there is an available UL-SCH resource or configured UL-grant detected within the preset time interval, the uplink resource SR which is in a pending state is cancelled.

In an embodiment of the present disclosure, if the UE detects an available UL-SCH resource within a preset time interval after the uplink resource SR is triggered, the currently detected UL-SCH resource is used to send to-be-transmitted data and/or the BSR, and the UE does not need to request an uplink transmission resource from the base station by sending an uplink resource SR. Therefore, the uplink resource SR in the pending state is cancelled.

In another embodiment of the present disclosure, if the UE detects the configured UL-grant within a preset time interval after the uplink resource SR is triggered, for example, the base station subsequently configures the UL-grant for the UE in real time, and the UE-grant is sent to the UE within the preset time interval through Radio Resource Control (RRC) upper layer control signaling, the UE can predict the availability of UL-SCH resource in the future based on the subsequently configured UL-grant. When the available UL-SCH resource arrives, data can be transmitted and/or the UE can request the uplink transmission resources to the base station by sending the BSR, which is the manner of the highest priority, and there is no need to request the uplink transmission resources to the base station by sending the uplink resource SR. Therefore, the uplink resource SR in the pending state is canceled, and it is not needed to request the base station to allocate the uplink transmission resources by initiating a contention random access request.

In step 13, before the contention based random access procedure is completed, whether a preset random access cancellation condition is satisfied is determined.

In embodiments of the present disclosure, it takes some time, such as 5 ms, for the UE to trigger a contention based random access request and complete a contention based random access procedure with the base station. During this procedure, the UE may also determine whether the preset random access cancellation condition is satisfied according to the detected resource information; if the preset random access cancellation condition is not satisfied, the contention based random access procedure is continued; if the preset random access cancellation condition is satisfied, step 14 is performed.

In step 14, if the preset random access cancellation condition is satisfied, the contention based random access procedure is cancelled. The preset random access cancellation condition includes at least the situation that valid uplink resource information is detected.

In embodiments of the present disclosure, the valid uplink resource information may include: an available uplink shared channel (UL-SCH) resource, or a configured uplink resource grant (UL-grant).

Similarly, after the contention based random access request is triggered, the UE may not necessarily send the contention based random access request to the base station immediately, and the UE may determine whether there is currently available random access channel resource. That is, there may be a time interval between the time moment when the UE triggers the contention based random access request and the actual time moment when the contention based random access request can be sent to the base station. For example, in an NR system, the random access channel may be relatively sparsely configured. Assuming that the basic information transmission unit of the system is one subframe, the system may configure random access channel resources only in odd or even frames. As an example, the system configures random access channel resources only in odd frames, the current frame in which the UE initiates a contention based random access request is an odd frame, such as TTI1, the nearest random access channel is located in TTI3, with a gap in the middle, i.e., a basic information transmission unit TTI2. If the UE detects valid uplink resource information when TTI2 arrives, UE may cancel the contention based random access procedure.

On the other hand, even if there is a random access channel resource available on the system transmission link when the UE triggers a contention based random access request, it takes time for the UE to complete the entire contention based random access procedure. In embodiments of the present disclosure, it is also possible to determine whether valid uplink resource information can be detected within the above-mentioned time, and if detected, the contention based random access procedure can be terminated.

Figure 5:
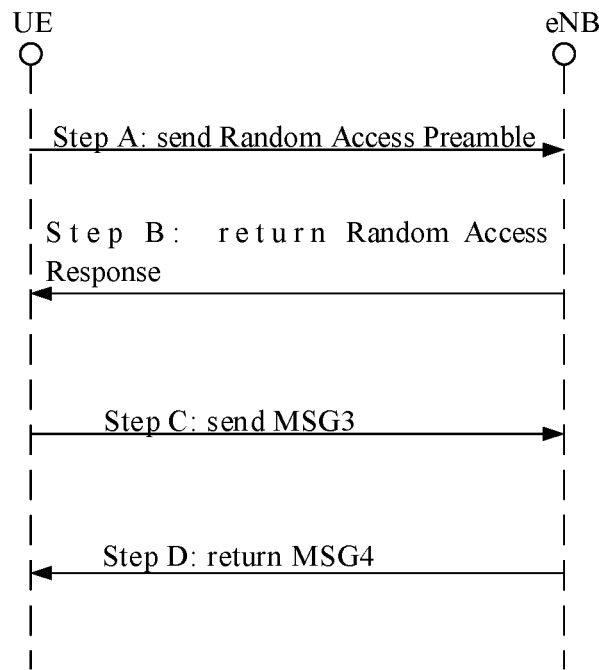
FIG. 5 is a schematic diagram illustrating a contention-based random access procedure according to an example of the present disclosure.

Assuming that the contention based random access mechanism specified in the LTE system is still used during the LTE-NR interworking phase, the above-mentioned contention based random access procedure is shown in FIG. 5. According to relevant knowledge, the UE and the base station eNB complete the contention based random access procedure in the following four steps:

In step A, the UE sends a Random Access Preamble to the base station.

In step B, the base station returns a Random Access Response to the UE.

The Random Access Response can be referred to as RA Response message, also referred to as MSG2. The RA Response message includes PUSCH uplink scheduling information allocated for transmission of MSG3, including contents such as whether there is frequency hopping, modulation coding rate, access resources, access time or the like.

In step C, the UE sends MSG3 to the base station.

The UE may transmit MSG3 in the uplink resource allocated by the eNB for the UE in the RA Response, so as to perform subsequent data transmission.

In step D, The base station sends MSG4 to the UE.

The base station eNB and the UE finally complete the contention resolution through MSG4.

In embodiments of the present disclosure, depending on the valid uplink resource information detected by the UE in the contention based random access procedure and the phases when the UE detects the valid uplink resource information, the preset random access cancellation condition may include the following cases:

In a first case, the UE detects a UL-grant allocated by the base station on a Physical Downlink Control Channel (PDCCH) before the random access procedure is completed. The preset random access cancellation condition may include any one of the following:

Cancellation condition 1: the UL-grant allocated by the base station is received on the PDCCH.

That is, before the contention based random access procedure is completed, if a UL-grant allocated by the base station is received on the PDCCH, the UE can predict that there will be a subsequent available UL-SCH resource. When the subsequent available UL-SCH resource arrives, the UL-SCH resource can be used to send a BSR to the base station to request uplink transmission resources. There is no need to request the base station to allocate uplink transmission resources for the UE through the contention based random access method. Therefore, the UE can cancel the above contention based random access procedure to save system signaling overhead and save system resources.

Cancellation condition 2: the UL-grant allocated by the base station is received on the PDCCH, and first preset sending information in the contention based random access procedure is not sent to the base station.

In an embodiment of the present disclosure, the first preset sending information may be a random access preamble sent by the UE to the base station in step A.

Cancellation condition 3: the UL-grant allocated by the base station is received on the PDCCH and first preset response information sent by the base station in the contention based random access procedure is not received.

In an embodiment of the present disclosure, the first preset response information may be a response RAR to the Random Access-Radio Network Temporary Identifier (RA-RNTI), and the response RAR is sent by the base station to the UE. The RAR to the RA-RNTI includes UL-grant.

Cancellation condition 4: the UL-grant allocated by the base station is received on the PDCCH, and the second preset sending information in the contention based random access procedure is not sent to the base station.

In an embodiment of the present disclosure, the second preset sending information may be MSG3 sent by the UE to the base station in step D.

In embodiments of the present disclosure, if the UE receives the UL-grant allocated by the base station to the UE through the PDCCH before the time node corresponding to any step before the random access procedure is completed, the UE can immediately terminate the contention based random access procedure, so as to reduce signaling overhead and save system resources.

In a second case, the UE receives the UL-SCH resource allocated by the base station before the random access procedure is completed. The preset random access cancellation condition may include any one of the following:

First Cancellation Condition: a target uplink shared channel resource is monitored. The target uplink shared channel resource may be a valid uplink shared channel resource provided by the base station. In an embodiment, the target uplink shared channel resource is an uplink shared channel resource provided by the base station before responding to the contention based random access request.

That is, before the contention based random access procedure is completed, if the UE monitors the UL-SCH resources allocated to the UE by the base station, the UE may use the currently monitored available UL-SCH resources to send a BSR to the base station to request uplink transmission resources, and there is no need to request the base station to allocate uplink transmission resources for the UE through the contention based random access method. Accordingly, the above-mentioned contention based random access procedure can be cancelled.

Second Cancellation Condition: the target uplink shared channel resource is monitored, and first preset sending information in the contention based random access procedure is not sent to the base station.

Similar to the above cancellation condition 2, in an embodiment of the present disclosure, the first preset sending message may be the random access preamble in step A shown in FIG. 5.

Third Cancellation Condition: the target uplink shared channel resource is monitored, and first preset response information sent by the base station in the contention based random access procedure is not received.

Similar to the above cancellation condition 3, in an embodiment of the present disclosure, the first preset response information may be the response RAR to the Random Access-Radio Network Temporary Identifier (RA-RNTI), and the response RAR is sent by the base station to the UE, as shown in step B of FIG. 5.

Fourth Cancellation Condition: the target uplink shared channel resource is monitored, and the second preset sending information in the contention based random access procedure is not sent to the base station.

Similar to the above cancellation condition 4, in an embodiment of the present disclosure, the second preset sending information may be MSG3 sent by the UE to the base station in step D shown in FIG. 5.

In embodiments of the present disclosure, before the contention based random access procedure is completed, if the UE monitors the available UL-SCH resources on the PUSCH, the UE may unilaterally cancel the contention based random access procedure to save signaling overhead. In addition, when the UE detects that there are available UL-SCH resources, the UE can use the currently available UL-SCH resources to send to-be-transmitted data and/or BSR to the base station, which can shorten the transmission delay of the to-be-transmitted uplink data. Or, by sending the BSR, it is possible for the base station to allocate sufficient uplink transmission resources to the UE at one time, avoiding that the UE sends one or more subsequent requests for uplink transmission resources to the base station again due to insufficient uplink transmission resources. Accordingly, embodiments of the present disclosure can improve the timeliness of transmission of the current data to be transmitted and thereby improve 5G network user experience.

In addition, in embodiments of the present disclosure, any one of the preset SR trigger condition, preset random access trigger condition, and preset random access cancellation condition may be dynamically configured by the base station according to the current scheduling information for the UE. In an embodiment of the present disclosure, before performing the above step 101, the method may further include: configuring the preset SR trigger condition according to SR trigger configuration information sent by the base station. The first preset time interval involved in the preset SR trigger condition may be a time interval determined by the base station according to the current scheduling information for the UE, and the base station may dynamically adjust the preset SR trigger condition according to the adjustment of scheduling information for the UE. Accordingly, the UE uses an appropriate resource detection time window to accurately determine the location of the available UL-SCH resources or quickly obtain the configured UL-grant to ensure that the UE can request uplink transmission resources from the base station in a timely and accurate manner.

Similarly, in another embodiment of the present disclosure, before performing the above step 11, the method may further include: configuring the preset random access trigger condition according to random access trigger configuration information sent by the base station.

The preset time interval involved in the preset random access trigger condition may also be a time interval determined by the base station according to the current scheduling information for the UE, and the base station may dynamically adjust the preset random access trigger conditions according to the adjustment of the scheduling information for the UE, so as to ensure that the UE requests uplink transmission resources from the base station according to a descending order of priorities of the uplink resource request methods, which saves signaling overhead and avoids resource waste.

In another embodiment of the present disclosure, before performing step 13, for example, before step 11, the method may further include: configuring the preset random access cancellation condition according to access cancellation configuration information sent by the base station.

In embodiments of the present disclosure, the UE may receive the access cancellation configuration information sent by the base station to flexibly configure the random access cancellation condition, and may flexibly configure the random access cancellation condition according to different requirements. For example, any one of the cancellation conditions 1 to 4 described above may be used to determine whether to cancel the contention based random access procedure, and thus the signaling overhead that the UE spends on continuously detecting valid resource information may be saved before the uplink transmission resources indicated by the UL-grant arrive. Using the above first cancellation condition to the fourth cancellation condition to determine whether to cancel the contention based random access procedure can increase the probability of obtaining uplink transmission resources through the BSR method, ensure that the UE obtains the uplink transmission resources allocated by the base station by using the BSR method which is of the highest priority, and reduces the probability that the UE applies to the base station for an uplink transmission resource in a contention based random access request manner, thereby reducing the transmission delay of the data to be transmitted.

To simplify the description, the foregoing method embodiments are all described as a series of action combinations, but those skilled in the art should know that the present disclosure is not limited by the described action order, because in this disclosure, certain steps may be performed in other orders or simultaneously.

Those skilled in the art should also know that the embodiments described herein are all examples, and the actions and modules involved are not necessarily required by the present disclosure.

Corresponding to the foregoing application function implementation method embodiments, the present disclosure also provides embodiments of an application function implementation device and a corresponding terminal.

Figure 6:
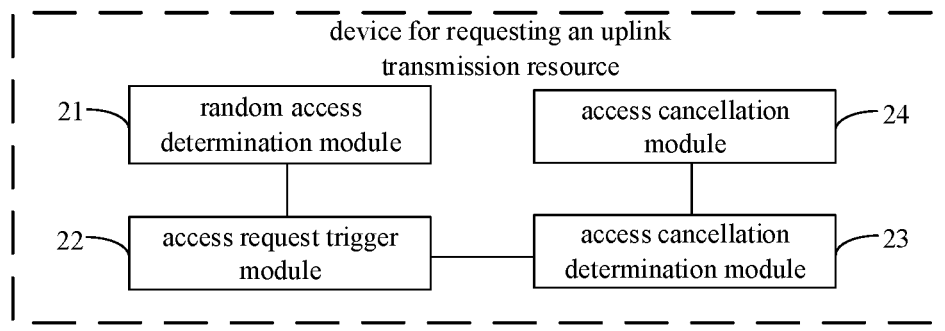
FIG. 6 is a block diagram of a device for requesting an uplink transmission resource according to an example of the present disclosure.

An embodiment of the present disclosure provides a device for requesting an uplink transmission resource. The device is applied in a user terminal. FIG. 6 is a block diagram of a device for requesting an uplink transmission resource according to an example. The device may include a random access determination module 21, an access request trigger module 22, an access cancellation determination module 23 and an access cancellation module 24.

The random access determination module 21 is configured to, after an uplink resource Scheduling Request (SR) is triggered, determine whether a preset random access trigger condition is satisfied.

The access request trigger module 22 is configured to, if the preset random access trigger condition is satisfied, trigger a contention based random access request.

According to an embodiment of the present disclosure, the access request trigger module 22 may be configured to, if there is no valid physical uplink control channel (PUCCH) resource configured for transmitting the uplink resource SR at any time, and there is no available UL-SCH resource and there is no configured UL-grant within a preset time interval, trigger the contention based random access request.

The access cancellation determination module 23 is configured to, before a contention based random access procedure is completed, determine whether a preset random access cancellation condition is satisfied.

The access cancellation module 24 is configured to, if the preset random access cancellation condition is satisfied, cancel the contention based random access procedure. The preset random access cancellation condition includes at least the following situation that valid uplink resource information is detected. The valid uplink resource information may include an available uplink shared channel (UL-SCH) resource, or a configured uplink resource grant (UL-grant)

According to a device embodiment of the present disclosure, the preset random access cancellation condition includes any one of the following cases that:

a UL-grant allocated by a base station is received on a physical downlink control channel (PDCCH);

the UL-grant allocated by the base station is received on the PDCCH, and first preset sending information in the contention based random access procedure is not sent to the base station;

the UL-grant allocated by the base station is received on the PDCCH, and first preset response information sent by the base station in the contention based random access procedure is not received; and the UL-grant allocated by the base station is received on the PDCCH, and second preset sending information in the contention based random access procedure is not sent to the base station.

According to another device embodiment of the present disclosure, the preset random access cancellation condition may further includes any one of the following cases that:

a target uplink shared channel resource is monitored, wherein the target uplink shared channel resource is an uplink shared channel resource provided by the base station before responding to the contention based random access request;

the target uplink shared channel resource is monitored and first preset sending information in the contention random access procedure is not sent to the base station;

the target uplink shared channel resource is monitored and first preset response information sent by the base station in the contention based random access procedure is not received; and the target uplink shared channel resource is monitored and second preset sending information in the contention random access procedure is not sent to the base station.

Figure 7:
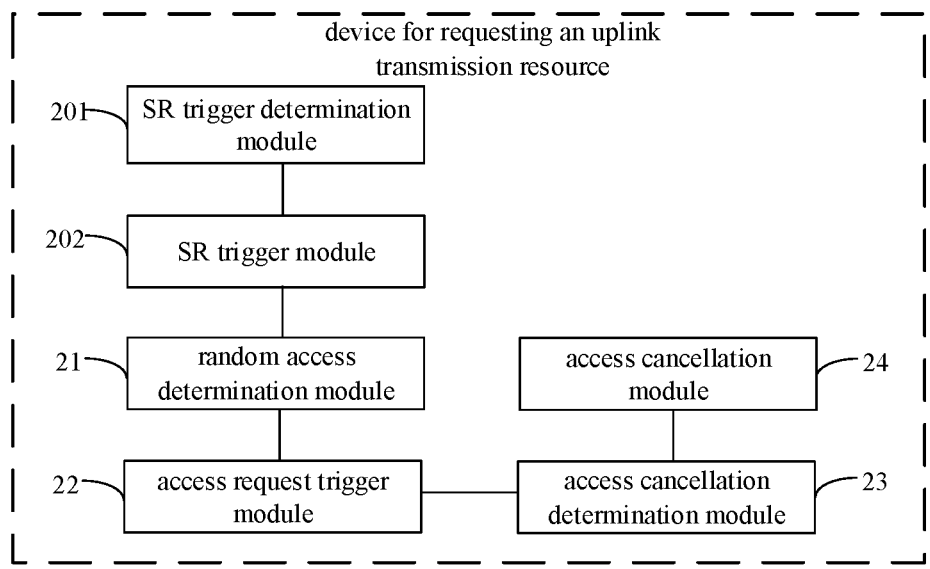
FIG. 7 is a block diagram of a device for requesting an uplink transmission resource according to an example of the present disclosure.

FIG. 7 is a block diagram of a device for requesting an uplink transmission resource according to an example. On the basis of the device embodiment as shown in FIG. 6, the device may further include an SR trigger determination module 201 and an SR trigger module 202.

The SR trigger determination module 201 is configured to, after a to-be-sent Buffer Status Report (BSR) is determined, determine whether a preset SR trigger condition is satisfied, wherein the preset SR trigger condition includes that there is no available uplink shared channel (UL-SCH) resource and there is no configured UL-grant within a first preset time interval.

The SR trigger module 202 is configured to, if the preset SR trigger condition is satisfied, trigger the uplink resource SR.

Figure 8:
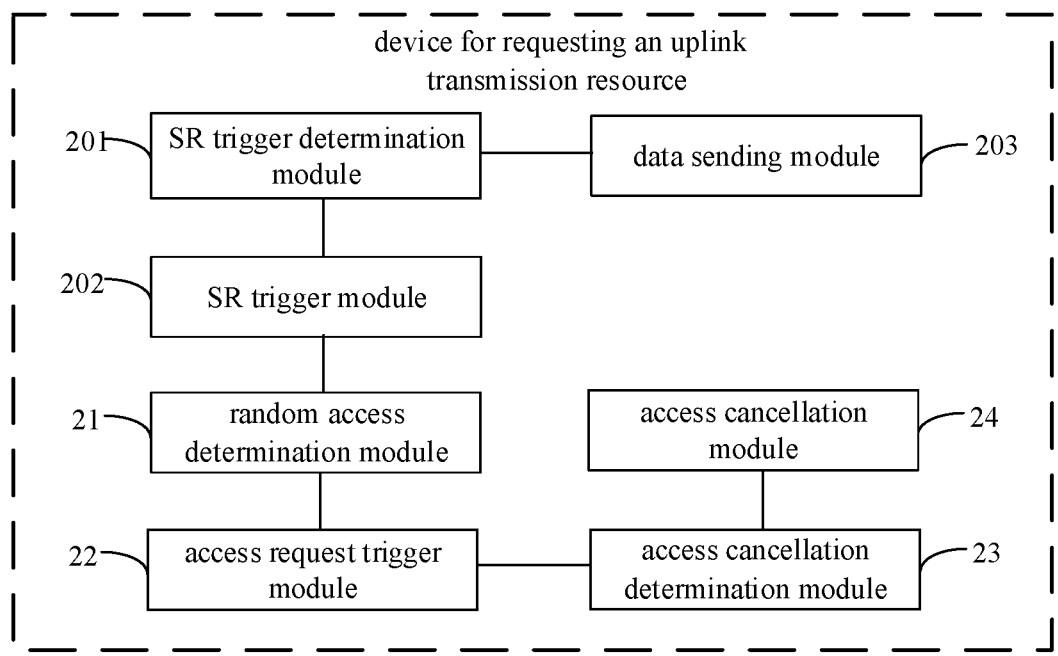
FIG. 8 is a block diagram of a device for requesting an uplink transmission resource according to an example of the present disclosure.

FIG. 8 is a block diagram of a device for requesting an uplink transmission resource according to an example. On the basis of the device embodiment shown in FIG. 7, the device may further include a data sending module 203.

The data sending module 203 is configured to, if there is an available UL-SCH resource received or the UL-grant is configured within the first preset time interval, send to-be-transmitted data and/or the BSR to a base station by using the available UL-SCH resource or an uplink transmission resource indicated by the UL-grant.

Figure 9:
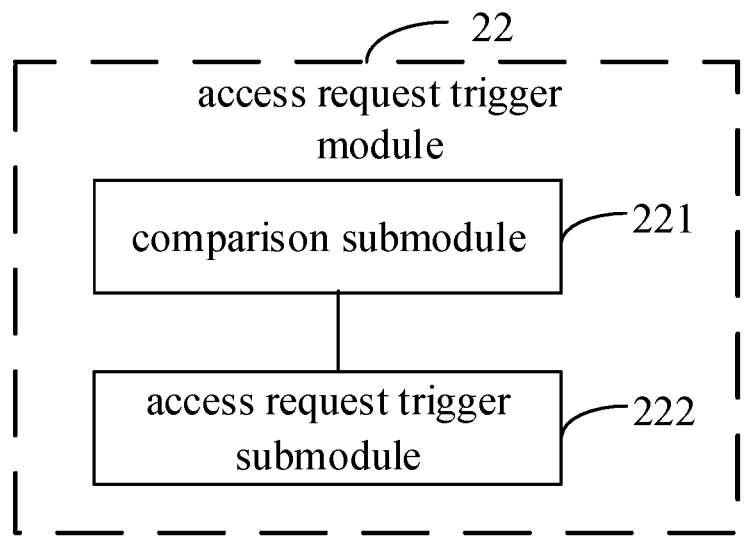
FIG. 9 is a block diagram of a device for requesting an uplink transmission resource according to an example of the present disclosure.

FIG. 9 is a block diagram of a device for requesting an uplink transmission resource according to an example. On the basis of the device embodiment shown in any one of FIGS. 6 to 8, the access request trigger module 22 may include a comparison submodule 221 and an access request trigger submodule 222.

The comparison submodule 221 is configured to, if at least one valid physical uplink control channel (PUCCH) resource is configured for transmitting the uplink resource SR, and there is no available UL-SCH resource and there is no configured UL-grant within a preset time interval, determine whether a total number of times for sending the uplink resource SR exceeds a preset threshold.

The access request trigger submodule 222 is configured to, if the total number of times for sending the uplink resource SR exceeds the preset threshold, trigger the contention based random access request.

Figure 10:
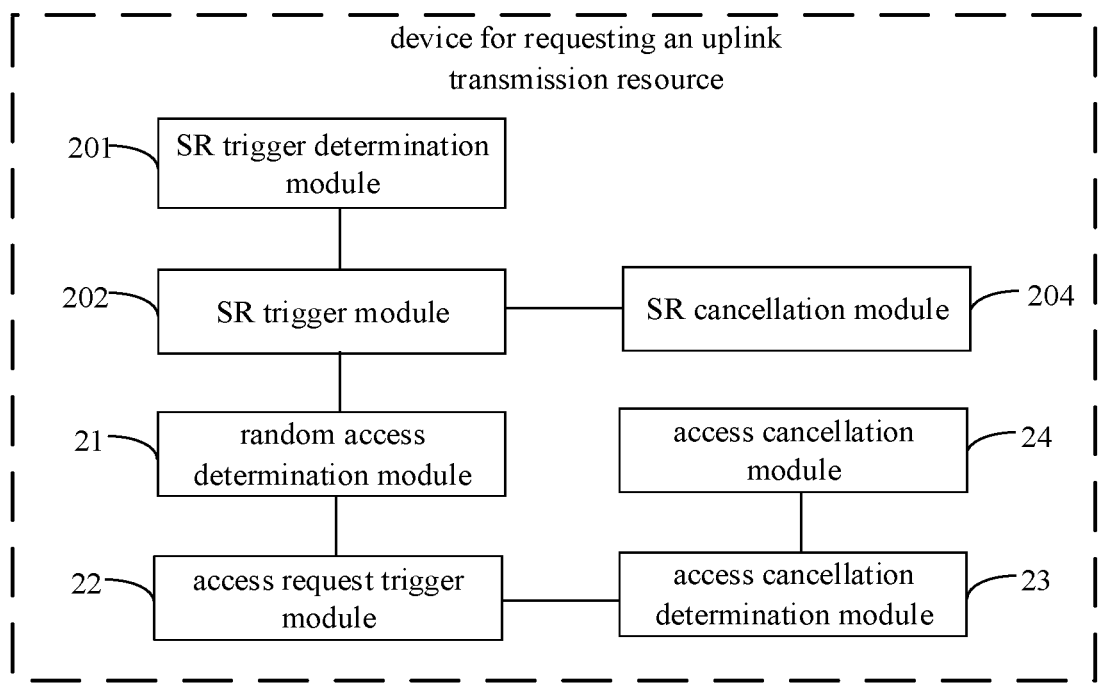
FIG. 10 is a block diagram of a device for requesting an uplink transmission resource according to an example of the present disclosure.

FIG. 10 is a block diagram of a device for requesting an uplink transmission resource according to an example. On the basis of the device shown in FIG. 7, the device may further include an SR cancellation module 204.

The SR cancellation module 204 is configured to, if there is an available UL-SCH resource or configured UL-grant within a preset time interval, cancel the uplink resource SR which is in a pending state.

In an embodiment of the device for requesting an uplink transmission resource, at least one of the following configuration modules can be included:

a first configuration module configured to configure the preset SR trigger condition according to SR trigger configuration information sent by a base station;

a second configuration module configured to configure the preset random access trigger condition according to random access trigger configuration information sent by a base station; or a third configuration module configured to configure the preset random access cancellation condition according to access cancellation configuration information sent by a base station.

In embodiments of the present disclosure, the first preset time interval and/or the preset time interval is a basic information transmission unit in a New Radio (NR) system.

The device embodiments basically correspond to the method embodiments, details regarding the device embodiments can be found in the description regarding the method embodiments. The device embodiments described above are only schematic, in which the units described as separate components may or may not be physically separated, and the components shown as units may or may not be physical units, that is, they may be located in one place, or can be distributed across multiple network elements. Some or all of the modules can be selected according to actual needs to achieve the objectives of the technical solutions of the present disclosure. Those of ordinary skill in the art can understand and implement the technical solutions of the present disclosure without creative efforts.

An embodiment of the present disclosure provides a device for requesting an uplink transmission resource, including:

a processor; and a memory for storing instructions executable by the processor;

wherein the processor is configured to:

after trigger an uplink resource Scheduling Request (SR), determine whether a preset random access trigger condition is satisfied;

if the preset random access trigger condition is satisfied, trigger a contention based random access request;

before a contention based random access procedure is completed, determine whether a preset random access cancellation condition is satisfied; and if the preset random access cancellation condition is satisfied, cancel the contention based random access procedure, wherein the preset random access cancellation condition includes at least detecting valid uplink resource information.

According to embodiments of the present disclosure, there is provided a method for requesting an uplink transmission resource. The method includes:

after triggering an uplink resource Scheduling Request (SR), in response to a preset random access trigger condition, triggering a contention based random access request;

before completing a contention based random access procedure, in response to a preset random access cancellation condition, cancelling the contention based random access procedure, wherein the preset random access cancellation condition comprises at least:

the target uplink shared channel resource is monitored and second preset transmission information in the contention random access procedure is not sent to a base station, wherein the target uplink shared channel resource is valid uplink share channel resource provided by the base station.

According to embodiments of the present disclosure, the method further includes:

after determining a Buffer Status Report (BSR) to be transmitted, in response to a preset SR trigger condition, triggering the uplink resource SR, wherein the preset SR trigger condition comprises that there is no available uplink shared channel (UL-SCH) resource and there is no configured UL-grant within a first preset time interval.

According to embodiments of the present disclosure, the method further includes:

in response to an available UL-SCH resource received or the UL-grant configured within the first preset time interval, sending data and/or the BSR to be transmitted to a base station by using the available UL-SCH resource or an uplink transmission resource indicated by the UL-grant.

According to embodiments of the present disclosure, in response to the preset random access trigger condition, triggering a contention based random access request includes:

in response to no valid physical uplink control channel (PUCCH) resource configured for transmitting the uplink resource SR at any time, or no available UL-SCH resource and no UL-grant configured within a preset time interval, triggering the contention based random access request.

According to embodiments of the present disclosure, in response to the preset random access trigger condition, triggering a contention based random access request includes:

in response to at least one valid physical uplink control channel (PUCCH) resource configured for transmitting the uplink resource SR, or no available UL-SCH resource and no UL-grant configured within a preset time interval, determining whether a total number of times for sending the uplink resource SR exceeds a preset threshold; and in response to the total number of times for sending the uplink resource SR exceeding the preset threshold, triggering the contention based random access request.

According to embodiments of the present disclosure, the method further includes:

in response to there is an available UL-SCH resource or UL-grant configured within a preset time interval, cancelling the uplink resource SR which is in a pending state.

According to embodiments of the present disclosure, the preset random access cancellation condition comprises any one of the following cases that:

a UL-grant allocated by a base station is received on a physical downlink control channel (PDCCH);

the UL-grant allocated by the base station is received on the PDCCH, and first preset transmission information in the contention based random access procedure is not sent to the base station;

the UL-grant allocated by the base station is received on the PDCCH, and first preset response information sent by the base station in the contention based random access procedure is not received; and the UL-grant allocated by the base station is received on the PDCCH, and second preset transmission information in the contention based random access procedure is not sent to the base station.

According to embodiments of the present disclosure, the preset random access cancellation condition comprises any one of the following cases that:

a target uplink shared channel resource is monitored, wherein the target uplink shared channel resource is an uplink shared channel resource provided by the base station before responding to the contention based random access request;

the target uplink shared channel resource is monitored and first preset transmission information in the contention random access procedure is not sent to the base station;

the target uplink shared channel resource is monitored and first preset response information sent by the base station in the contention based random access procedure is not received; and the target uplink shared channel resource is monitored and second preset transmission information in the contention random access procedure is not sent to the base station.

According to embodiments of the present disclosure, the method further comprises:

configuring the preset SR trigger condition according to SR trigger configuration information sent by a base station.

According to embodiments of the present disclosure, the method further comprises:

configuring the preset random access trigger condition according to random access trigger configuration information sent by a base station.

According to embodiments of the present disclosure, the method further comprises:

configuring the preset random access cancellation condition according to access cancellation configuration information sent by a base station.

According to embodiments of the present disclosure, the first preset time interval and/or the preset time interval is a basic information transmission unit in a New Radio (NR) system.

According to embodiments of the present disclosure, there is provided a device for requesting an uplink transmission resource. The device is applied in a user terminal and includes: a memory and a processor for storing instructions. The processor is configured to:

after trigger an uplink resource Scheduling Request (SR), in response to a preset random access trigger condition, trigger a contention based random access request;

before complete a contention based random access procedure, in response to a preset random access cancellation condition, cancel the contention based random access procedure, wherein the preset random access cancellation condition comprises at least:

the target uplink shared channel resource is monitored and second preset transmission information in the contention random access procedure is not sent to a base station, wherein the target uplink shared channel resource is valid uplink share channel resource provided by the base station.

According to embodiments of the present disclosure, the processor is further configured to:

after determine a Buffer Status Report (BSR) to be transmitted, in response to a preset SR trigger condition, trigger the uplink resource SR, wherein the preset SR trigger condition comprises that there is no available uplink shared channel (UL-SCH) resource and there is no configured UL-grant within a first preset time interval.

According to embodiments of the present disclosure, the processor is configured to:

in response to no valid physical uplink control channel (PUCCH) resource configured for transmitting the uplink resource SR at any time, or no available UL-SCH resource and no UL-grant configured within a preset time interval, trigger the contention based random access request.

According to embodiments of the present disclosure, the processor is configured to:

in response to at least one valid physical uplink control channel (PUCCH) resource configured for transmitting the uplink resource SR, or no available UL-SCH resource and no UL-grant configured within a preset time interval, determine whether a total number of times for sending the uplink resource SR exceeds a preset threshold; and in response to the total number of times for sending the uplink resource SR exceeding the preset threshold, trigger the contention based random access request.

According to embodiments of the present disclosure, the processor is further configured to:

in response to there is an available UL-SCH resource or UL-grant configured within a preset time interval, cancel the uplink resource SR which is in a pending state.

According to embodiments of the present disclosure, the preset random access cancellation condition comprises any one of the following cases that:

a UL-grant allocated by a base station is received on a physical downlink control channel (PDCCH);

the UL-grant allocated by the base station is received on the PDCCH, and first preset transmission information in the contention based random access procedure is not sent to the base station;

the UL-grant allocated by the base station is received on the PDCCH, and first preset response information sent by the base station in the contention based random access procedure is not received; and the UL-grant allocated by the base station is received on the PDCCH, and second preset transmission information in the contention based random access procedure is not sent to the base station.

According to embodiments of the present disclosure, the preset random access cancellation condition comprises any one of the following cases that:

a target uplink shared channel resource is monitored, wherein the target uplink shared channel resource is an uplink shared channel resource provided by the base station before responding to the contention based random access request;

the target uplink shared channel resource is monitored and first preset transmission information in the contention random access procedure is not sent to the base station;

the target uplink shared channel resource is monitored and first preset response information sent by the base station in the contention based random access procedure is not received; and the target uplink shared channel resource is monitored and second preset transmission information in the contention random access procedure is not sent to the base station.

According to embodiments of the present disclosure, the processor is further configured to:

configure the preset SR trigger condition according to SR trigger configuration information sent by a base station.

Figure 11:
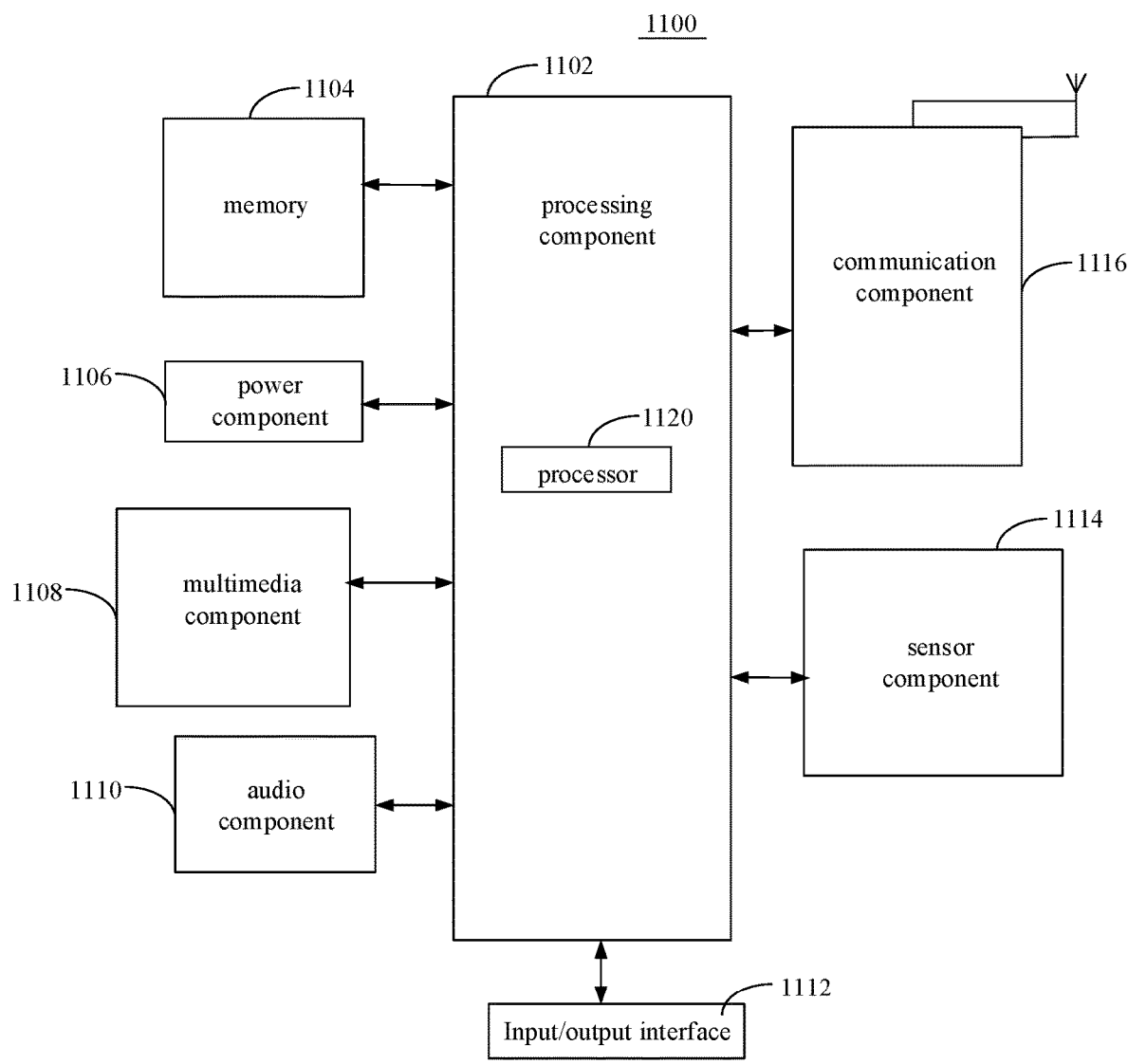
FIG. 11 is a block diagram of a device for requesting an uplink transmission resource according to an example of the present disclosure.

FIG. 11 is a block diagram of a device 1100 for requesting an uplink transmission resource according to an example. As shown in FIG. 11, the device 1100 may be a terminal, for example, the device 1100 may be a mobile phone, a computer, a digital broadcast terminal, a messaging device, a gaming console, a tablet, a medical device, exercise equipment, a personal digital assistant, a wearable device such as a smart watch, smart glasses, a smart bracelet, smart running shoes, and the like.

Referring to FIG. 11, the device 1100 may include one or more of the following components: a processing component 1101, a memory 1104, a power component 1106, a multimedia component 1108, an audio component 1110, an input/output (I/O) interface 1112, a sensor component 1114, and a communication component 1116.

The processing component 1102 typically controls overall operations of the device 1100, such as the operations associated with display, telephone calls, data communications, camera operations, and recording operations. The processing component 1102 may include one or more processors 1120 to execute instructions to perform all or part of the steps in the above described methods. Moreover, the processing component 1102 may include one or more modules which facilitate the interaction between the processing component 1102 and other components. For instance, the processing component 1102 may include a multimedia module to facilitate the interaction between the multimedia component 1108 and the processing component 1102.

The memory 1104 is configured to store various types of data to support the operation of the device 1100. Examples of such data include instructions for any applications or methods operated on the device 1100, contact data, phonebook data, messages, pictures, video, etc. The memory 1104 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 provides power to various components of the device 1100. The power component 1100 may include a power management system, one or more power sources, and any other components associated with the generation, management, and distribution of power in the device 1100.

The multimedia component 1108 includes a screen providing an output interface between the device 1100 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 1108 includes a front camera and/or a rear camera. The front camera and the rear camera may receive an external multimedia datum while the device 1100 is in an operation mode, such as a photographing mode or a video mode. Each of the front camera and the rear camera may be a fixed optical lens system or have focus and optical zoom capability.

The audio component 1110 is configured to output and/or input audio signals. For example, the audio component 1110 includes a microphone ("MIC") configured to receive an external audio signal when the device 1100 is in an operation mode, such as a call mode, a recording mode, and a voice recognition mode. The received audio signal may be further stored in the memory 1104 or transmitted via the communication component 1116. In some embodiments, the audio component 1110 further includes a speaker to output audio signals.

The I/O interface 1112 provides an interface between the processing component 1102 and peripheral interface modules, such as a keyboard, a click wheel, buttons, and the like. The buttons may include, but are not limited to, a home button, a volume button, a starting button, and a locking button.

The sensor component 1114 includes one or more sensors to provide status assessments of various aspects of the device 1100. For instance, the sensor component 1114 may detect an open/closed status of the device 1100, relative positioning of components, e.g., the display and the keypad, of the device 1100, a change in position of the device 1100 or a component of the device 1100, a presence or absence of user contact with the device 1100, an orientation or an acceleration/deceleration of the device 1100, and a change in temperature of the device 1100. The sensor component 1114 may include a proximity sensor configured to detect the presence of nearby objects without any physical contact. The sensor component 1114 may also include a light sensor, such as a CMOS or CCD image sensor, for use in imaging applications. In some embodiments, the sensor component 1114 may also include an accelerometer sensor, a gyroscope sensor, a magnetic sensor, a pressure sensor, or a temperature sensor.

The communication component 1116 is configured to facilitate communication, wired or wirelessly, between the device 1100 and other devices. The device 1100 can access a wireless network based on a communication standard, such as WiFi, 2G, or 3G, or a combination thereof. In one example, the communication component 1116 receives a broadcast signal or broadcast associated information from an external broadcast management system via a broadcast channel. In one example, the communication component 2908 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In examples, the device 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In examples, there is also provided a non-transitory computer-readable storage medium including instructions, such as the memory 1104 including instructions executable by the processor 1120 in the device 1100, for performing the above-described methods for request an uplink transmission resource according to any one of FIG. 1 to FIG. 4. For example, the non-transitory computer-readable storage medium may be a ROM, a RAM, a CD-ROM, a magnetic tape, a floppy disc, an optical data storage device, and the like.

According to examples, the method further includes:
after determining a to-be-sent Buffer Status Report (BSR), determining whether a preset SR trigger condition is satisfied, wherein the preset SR trigger condition includes that there is no available uplink shared channel (UL-SCH) resource and there is no configured UL-grant within a first preset time interval; and
if the preset SR trigger condition is satisfied, triggering the uplink resource SR.

According to examples, the method further includes:
if there is an available UL-SCH resource received or the UL-grant is configured within the first preset time interval, sending to-be-transmitted data and/or the BSR to a base station by using the available UL-SCH resource or an uplink transmission resource indicated by the UL-grant.

According to examples, if the preset random access trigger condition is satisfied, triggering a contention based random access request includes:
if there is no valid physical uplink control channel (PUCCH) resource configured for transmitting the uplink resource SR at any time, there is no available UL-SCH resource and there is no configured UL-grant within a preset time interval, triggering the contention based random access request.

According to examples, if the preset random access trigger condition is satisfied, triggering a contention based random access request includes:
if at least one valid physical uplink control channel (PUCCH) resource is configured for transmitting the uplink resource SR, there is no available UL-SCH resource and there is no configured UL-grant within a preset time interval, determining whether a total number of times for sending the uplink resource SR exceeds a preset threshold; and
if the total number of times for sending the uplink resource SR exceeds the preset threshold, triggering the contention based random access request.

According to examples, the method further includes:
if there is an available UL-SCH resource or configured UL-grant within a preset time interval, cancelling the uplink resource SR which is in a pending state.

According to examples, the preset random access cancellation condition includes any one of the following cases that:
a UL-grant allocated by a base station is received on a physical downlink control channel (PDCCH);
the UL-grant allocated by the base station is received on the PDCCH, and first preset sending information in the contention based random access procedure is not sent to the base station;
the UL-grant allocated by the base station is received on the PDCCH, and first preset response information sent by the base station in the contention based random access procedure is not received; and the UL-grant allocated by the base station is received on the PDCCH, and second preset sending information in the contention based random access procedure is not sent to the base station.

According to examples, the preset random access cancellation condition includes any one of the following cases that:

a target uplink shared channel resource is monitored, wherein the target uplink shared channel resource is an uplink shared channel resource provided by the base station before responding to the contention based random access request;

the target uplink shared channel resource is monitored and first preset sending information in the contention random access procedure is not sent to the base station;

the target uplink shared channel resource is monitored and first preset response information sent by the base station in the contention based random access procedure is not received; and the target uplink shared channel resource is monitored and second preset sending information in the contention random access procedure is not sent to the base station.

According to examples, before the determining whether a preset SR trigger condition is satisfied, the method further includes:

configuring the preset SR trigger condition according to SR trigger configuration information sent by a base station.

According to examples, before the determining whether a preset random access trigger condition is satisfied, the method further includes:

configuring the preset random access trigger condition according to random access trigger configuration information sent by a base station.

According to examples, before the determining whether a preset random access cancellation condition is satisfied, the method further includes:

configuring the preset random access cancellation condition according to access cancellation configuration information sent by a base station.

According to examples, the first preset time interval and/or the preset time interval is a basic information transmission unit in a New Radio (NR) system.

According to examples, the device further includes:

an SR trigger determination module configured to, after a to-be-sent Buffer Status Report (BSR) is determined, determine whether a preset SR trigger condition is satisfied, wherein the preset SR trigger condition includes that there is no available uplink shared channel (UL-SCH) resource and there is no configured UL-grant within a first preset time interval; and an SR trigger module configured to, if the preset SR trigger condition is satisfied, trigger the uplink resource SR.

According to examples, the device further includes:

a data sending module configured to, if there is an available UL-SCH resource received or the UL-grant is configured within the first preset time interval, send to-be-transmitted data and/or the BSR to a base station by using the available UL-SCH resource or an uplink transmission resource indicated by the UL-grant.

According to examples, the access request trigger module is configured to: if there is no valid physical uplink control channel (PUCCH) resource configured for transmitting the uplink resource SR at any time, there is no available UL-SCH resource and there is no configured UL-grant within a preset time interval, trigger the contention based random access request.

According to examples, the access request trigger module includes:

a comparison submodule configured to, if at least one valid physical uplink control channel (PUCCH) resource is configured for transmitting the uplink resource SR, there is no available UL-SCH resource and there is no configured UL-grant within a preset time interval, determine whether a total number of times for sending the uplink resource SR exceeds a preset threshold; and an access request trigger submodule configured to, if the total number of times for sending the uplink resource SR exceeds the preset threshold, trigger the contention based random access request.

According to examples, the device further includes:

an SR cancellation module configured to, if there is an available UL-SCH resource or configured UL-grant within a preset time interval, cancel the uplink resource SR which is in a pending state.

According to examples, the preset random access cancellation condition includes any one of the following cases that:

a UL-grant allocated by a base station is received on a physical downlink control channel (PDCCH);

the UL-grant allocated by the base station is received on the PDCCH, and first preset sending information in the contention based random access procedure is not sent to the base station;

the UL-grant allocated by the base station is received on the PDCCH, and first preset response information sent by the base station in the contention based random access procedure is not received; and the UL-grant allocated by the base station is received on the PDCCH, and second preset sending information in the contention based random access procedure is not sent to the base station.

According to examples, the preset random access cancellation condition includes any one of the following cases that:

a target uplink shared channel resource is monitored, wherein the target uplink shared channel resource is an uplink shared channel resource provided by the base station before responding to the contention based random access request;

the target uplink shared channel resource is monitored and first preset sending information in the contention random access procedure is not sent to the base station;

the target uplink shared channel resource is monitored and first preset response information sent by the base station in the contention based random access procedure is not received; and the target uplink shared channel resource is monitored and second preset sending information in the contention random access procedure is not sent to the base station.

According to examples, the device further includes:

a first configuration module configured to configure the preset SR trigger condition according to SR trigger configuration information sent by a base station.

According to examples, the device further includes:

a second configuration module configured to configure the preset random access trigger condition according to random access trigger configuration information sent by a base station.

According to examples, the device further includes:

a third configuration module configured to configure the preset random access cancellation condition according to access cancellation configuration information sent by a base station.

According to examples, the device further includes: the first preset time interval and/or the preset time interval is a basic information transmission unit in a New Radio (NR) system.

The technical solutions according to embodiments of the present disclosure may have the following advantageous effects:

In embodiments of the present disclosure, when the UE cannot apply for uplink transmission resources by sending an uplink Buffer Status Report (BSR) to the base station because there is no currently available uplink shared channel resource, the uplink resource Scheduling Request (SR) is triggered, and then according to a preset random access trigger condition, whether to cancel the to-be-sent uplink resource SR is determined, and the UE applies for the uplink transmission resources to the base station by triggering a random access request. After the random access request is triggered because a preset random access trigger condition is satisfied, before the random access procedure is completed, the user terminal can determine in real time whether an available uplink shared channel (UL-SCH) resource is allocated or whether there is a configured UL-grant. If an available uplink shared channel (UL-SCH) resource is allocated or there is a configured UL-grant, in a case that a preset random access cancellation condition is met, the above contention based random access procedure can be canceled, and the uplink transmission resources indicated by the valid uplink resource information can be used to send the to-be-transmitted data or BSR to the base station. The technical solutions according to embodiments of the present disclosure can avoid requesting uplink transmission resources through random access request in the case that there are available uplink transmission resources to send to-be-transmitted data, reducing waste of system resources.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A method for requesting an uplink transmission resource, comprising:
    triggering, by a user terminal in an LTE-NR interworking phase in a 5G network, an uplink resource Scheduling Request (SR);
    determining, by the user terminal, whether a preset random access trigger condition is satisfied;
    in response to the preset random access trigger condition being satisfied, triggering, by the user terminal, a contention based random access request; and
    before completing a contention based random access procedure, determining whether a preset random access cancellation condition is satisfied,
    wherein the preset random access cancellation condition comprises that a target uplink shared channel resource is monitored and second preset transmission information in a contention random access procedure is not sent to a base station, wherein the target uplink shared channel resource is a valid uplink shared channel resource, and the second preset transmission information is MSG3.

2. The method according to claim 1, further comprising:
    determining, by the user terminal, a Buffer Status Report (BSR) to be transmitted, in response to a preset SR trigger condition being satisfied, triggering, by the user terminal, the uplink resource SR, wherein the preset SR trigger condition comprises that there is no available uplink shared channel (UL-SCH) resource and there is no configured UL-grant within a first preset time interval.

3. The method according to claim 2, further comprising:
    in response to an available UL-SCH resource received or the UL-grant configured within the first preset time interval, sending, by the user terminal, data and/or the BSR to be transmitted to the base station by using the available UL-SCH resource or an uplink transmission resource indicated by the UL-grant.

4. The method according to claim 1, wherein, in response to the preset random access trigger condition being satisfied, triggering the contention based random access request comprises:
    in response to no valid physical uplink control channel (PUCCH) resource configured for transmitting the uplink resource SR at any time, or no available UL-SCH resource and no UL-grant configured within a preset time interval, triggering the contention based random access request.

5. The method according to claim 1, wherein, in response to the preset random access trigger condition being satisfied, triggering the contention based random access request comprises:
    in response to at least one valid physical uplink control channel (PUCCH) resource configured for transmitting the uplink resource SR, or no available UL-SCH resource and no UL-grant configured within a preset time interval, determining whether a total number of times for sending the uplink resource SR exceeds a preset threshold; and
    in response to the total number of times for sending the uplink resource SR exceeding the preset threshold, triggering the contention based random access request.

6. The method according to claim 1, further comprising:
    in response to an available UL-SCH resource or UL-grant configured within a preset time interval, cancelling the uplink resource SR which is in a pending state.

7. The method according to claim 1, wherein the preset random access cancellation condition comprises one of the following cases that:
    a UL-grant allocated by the base station is received on a physical downlink control channel (PDCCH);
    the UL-grant allocated by the base station is received on the PDCCH, and first preset transmission information in the contention based random access procedure is not sent to the base station;
    the UL-grant allocated by the base station is received on the PDCCH, and first preset response information sent by the base station in the contention based random access procedure is not received; and
    the UL-grant allocated by the base station is received on the PDCCH, and second preset transmission information in the contention based random access procedure is not sent to the base station.

8. The method according to claim 1, wherein the preset random access cancellation condition comprises one of the following cases that:

the target uplink shared channel resource is monitored and first preset transmission information in the contention random access procedure is not sent to the base station; and the target uplink shared channel resource is monitored and first preset response information sent by the base station in the contention based random access procedure is not received.

9. The method according to claim 2, wherein the method further comprises:
configuring the preset SR trigger condition according to SR trigger configuration information sent by the base station.

10. The method according to claim 1, wherein the method further comprises:
configuring the preset random access trigger condition according to random access trigger configuration information sent by the base station.

11. The method according to claim 1, wherein the method further comprises:
configuring the preset random access cancellation condition according to access cancellation configuration information sent by the base station.

12. The method according to claim 2, wherein the first preset time interval and/or the preset time interval is a basic information transmission unit in a New Radio (NR) system.

13. A user terminal in an LTE-NR interworking phase in a 5G network, the user terminal comprising:
a memory;
a processor for storing instructions;
wherein the processor is configured to:
trigger an uplink resource Scheduling Request (SR);
determine whether a preset random access trigger condition is satisfied;
in response to the preset random access trigger condition being satisfied, trigger a contention based random access request; and
before a contention based random access procedure is completed, determine whether a preset random access cancellation condition is satisfied,
wherein the preset random access cancellation condition comprises that a target uplink shared channel resource is monitored and second preset transmission information in a contention random access procedure is not sent to a base station, wherein the target uplink shared channel resource is a valid uplink share channel resource, and the second preset transmission information is MSG3.

14. The user terminal according to claim 13, wherein the processor is further configured to:
determine a Buffer Status Report (BSR) to be transmitted, in response to a preset SR trigger condition being satisfied, trigger the uplink resource SR, wherein the preset SR trigger condition comprises that there is no available uplink shared channel (UL-SCH) resource and there is no configured UL-grant within a first preset time interval.

15. The user terminal according to claim 13, wherein the processor is configured to:
in response to no valid physical uplink control channel (PUCCH) resource configured for transmitting the uplink resource SR at any time, or no available UL-SCH resource and no UL-grant configured within a preset time interval, trigger the contention based random access request.

16. The user terminal according to claim 13, wherein the processor is configured to:
in response to at least one valid physical uplink control channel (PUCCH) resource configured for transmitting the uplink resource SR, or no available UL-SCH resource and no UL-grant configured within a preset time interval, determine whether a total number of times for sending the uplink resource SR exceeds a preset threshold; and
in response to the total number of times for sending the uplink resource SR exceeding the preset threshold, trigger the contention based random access request.

17. The user terminal according to claim 13, wherein the processor is further configured to:
in response to an available UL-SCH resource or UL-grant configured within a preset time interval, cancel the uplink resource SR which is in a pending state.

18. The user terminal according to claim 13, wherein the preset random access cancellation condition comprises one of the following cases that:
a UL-grant allocated by the base station is received on a physical downlink control channel (PDCCH);
the UL-grant allocated by the base station is received on the PDCCH, and first preset transmission information in the contention based random access procedure is not sent to the base station;
the UL-grant allocated by the base station is received on the PDCCH, and first preset response information sent by the base station in the contention based random access procedure is not received; and
the UL-grant allocated by the base station is received on the PDCCH, and second preset transmission information in the contention based random access procedure is not sent to the base station.

19. The user terminal according to claim 13, wherein the preset random access cancellation condition comprises one of the following cases that:
the target uplink shared channel resource is monitored and first preset transmission information in the contention random access procedure is not sent to the base station;
the target uplink shared channel resource is monitored and first preset response information sent by the base station in the contention based random access procedure is not received.

20. The user terminal according to claim 13, wherein the processor is further configured to:
configure the preset SR trigger condition according to SR trigger configuration information sent by the base station.

* * * * *